(12) United States Patent
Nishimura et al.

(10) Patent No.: US 12,142,396 B2
(45) Date of Patent: Nov. 12, 2024

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Tetsuya Nishimura, Mie (JP); Motohiro Yokoi, Mie (JP); Kenta Ito, Mie (JP); Hidetoshi Ishida, Mie (JP); Ryusuke Kudo, Mie (JP); Masaki Mizushita, Mie (JP); Haruka Nakano, Mie (JP); Kenta Arai, Mie (JP); Daisuke Ebata, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 255 days.

(21) Appl. No.: 17/785,729

(22) PCT Filed: Dec. 2, 2020

(86) PCT No.: PCT/JP2020/044874
§ 371 (c)(1),
(2) Date: Jun. 15, 2022

(87) PCT Pub. No.: WO2021/124896
PCT Pub. Date: Jun. 24, 2021

(65) Prior Publication Data
US 2023/0047047 A1    Feb. 16, 2023

(30) Foreign Application Priority Data
Dec. 20, 2019    (JP) .................. 2019-230647

(51) Int. Cl.
*H01B 7/00*    (2006.01)
*H01B 7/08*    (2006.01)
(Continued)

(52) U.S. Cl.
CPC .......... *H01B 7/009* (2013.01); *H01B 7/0846* (2013.01); *B60R 16/0207* (2013.01); *G02B 6/3608* (2013.01)

(58) Field of Classification Search
CPC ..... H01B 7/009; H01B 7/0846; G02B 6/3608
(Continued)

(56) References Cited

U.S. PATENT DOCUMENTS

| 5,552,752 A | * | 9/1996 | Sturdivant | .............. H01P 1/047 |
| | | | | 333/260 |
| 2003/0102148 A1 | | 6/2003 | Ohara et al. | |

(Continued)

FOREIGN PATENT DOCUMENTS

| CN | 1490827 | 4/2004 |
| CN | 103813629 | 5/2014 |

(Continued)

OTHER PUBLICATIONS

International Search Report, in International Pat. Appl. No. PCT/JP2020/044874, dated Dec. 28, 2020, English translation.
(Continued)

*Primary Examiner* — Andargie M Aychillhum
(74) *Attorney, Agent, or Firm* — GREENBLUM & BERNSTEIN, P.L.C.

(57) ABSTRACT

A wiring member includes: a plurality of wire-like transmission members; and a sheet to which the plurality of wire-like transmission members are fixed, wherein an intersection region portion where the plurality of wire-like trans-
(Continued)

mission members are disposed on the sheet to intersect with each other is provided, and the intersection region portion includes a bending position.

11 Claims, 4 Drawing Sheets

(51) Int. Cl.
*B60R 16/02* (2006.01)
*G02B 6/36* (2006.01)

(58) Field of Classification Search
USPC .......................................................... 174/254
See application file for complete search history.

(56) References Cited

U.S. PATENT DOCUMENTS

| | | | |
|---|---|---|---|
| 2010/0233021 A1* | 9/2010 | Sliwa | A61M 25/0017 |
| | | | 422/20 |
| 2014/0131071 A1 | 5/2014 | Tanaka et al. | |
| 2014/0332267 A1 | 11/2014 | Tanaka et al. | |
| 2018/0075943 A1 | 3/2018 | Okamoto et al. | |
| 2018/0224975 A1 | 8/2018 | Koike et al. | |
| 2019/0375348 A1 | 12/2019 | Mizuno et al. | |
| 2019/0392963 A1 | 12/2019 | Ishida et al. | |

FOREIGN PATENT DOCUMENTS

| | | | | |
|---|---|---|---|---|
| CN | 104143387 | 11/2014 | | |
| CN | 107430905 | 12/2017 | | |
| CN | 110313039 | 10/2019 | | |
| CN | 110326061 | 10/2019 | | |
| JP | 64-16658 | 1/1989 | | |
| JP | 5-62543 | 3/1993 | | |
| JP | 7-320545 | 12/1995 | | |
| JP | H11308741 A | * 11/1999 | | |
| JP | 2002-56722 | 2/2002 | | |
| JP | 2002-373529 | 12/2002 | | |
| JP | 2003-112584 | 4/2003 | | |
| JP | 2003-168327 | 6/2003 | | |
| JP | 2005-192311 | 7/2005 | | |
| JP | 2006-253294 | 9/2006 | | |
| JP | 2012-84590 | 4/2012 | | |
| JP | 2016092405 A | * 5/2016 | .......... | H05K 1/0228 |
| JP | 2018-137208 | 8/2018 | | |
| WO | 2017/099174 | 6/2017 | | |
| WO | 2018/155166 | 8/2018 | | |

OTHER PUBLICATIONS

International Preliminary Report on Patentability, in International Pat. Appl. No. PCT/JP2020/044874, dated May 17, 2022, English translation.
Official Action, Japan Patent Office, in counterpart Japanese Patent Application No. 2019-230647, issued on Jan. 31, 2023 (with English translation).
China Office Action received in CN Application No. 202080086903. X, dated Jul. 18, 2023.

* cited by examiner

WIRING MEMBER

TECHNICAL FIELD

The present disclosure relates to a wiring member.

BACKGROUND ART

Patent Document 1, discloses a wire harness in which an electrical wire is welded to a functional exterior member termed into a sheet-like shape.

PRIOR ART DOCUMENTS

Patent Documents

Patent Document 1: Japanese Patent Application Laid-Open No. 2018-137208

SUMMARY

Problem to be Solved by the Invention

A wire harness described in Patent Document 1 is bended at a time of transportation, for example, in some cases. Strong force on an electrical wire is desired to be suppressed at a time of bending the wire harness.

Accordingly, an object is to provide a technique of suppressing strong force on a wire-like transmission member at a time of bending a wiring member.

Means to Solve the Problem

A wiring member according to the present disclosure is a wiring member including: a plurality of wire-like transmission members; and a sheet to which the plurality of wire-like transmission members are fixed, wherein an intersection region portion where the plurality of wire-like transmission members are disposed on the sheet to intersect with each other is provided, and the intersection region portion includes a bending position.

EFFECTS OF THE INVENTION

According to the present disclosure, suppressed is strong force on a wire-like transmission member at a time of bending a wiring member.

DESCRIPTION OF EMBODIMENT(S)

Description of Embodiment of Present Disclosure

Figure 1:
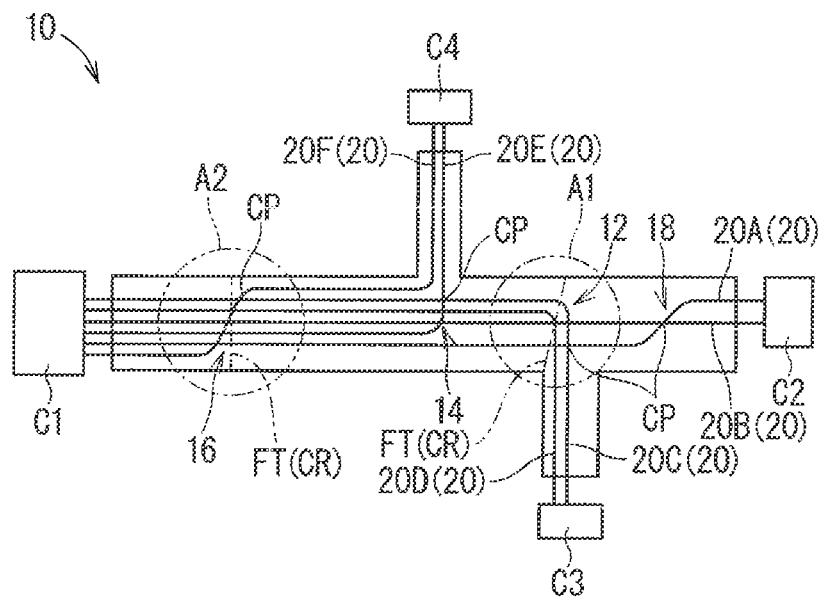
FIG. 1 is a diagram illustrating a wiring member according to an embodiment.

Embodiments of the present disclosure are listed and described firstly.

A wiring member according to the present disclosure is as follows.

(1) A wiring member includes: a plurality of wire-like transmission members; and a sheet to which the plurality of wire-like transmission members are fixed, wherein an intersection region portion where the plurality of wire-like transmission members are disposed on the sheet to intersect with each other is provided, and the intersection region portion includes a bending position. The intersection region portion in the wiring member is bended, thus strong force on the wire-like transmission member is suppressed. A plurality of actions are considered as this action, and first and second actions described hereinafter are considered as examples. Firstly, the wire-like transmission members are bended in a thickness direction so as to intersect with each other in the intersection region portion. This bending portion is beaded at a time of bending the intersection region portion, thus a region to which force is applied increases in a circumferential direction of the wire-like transmission member. Accordingly, force is diffused, and suppressed is strong force on the wire-like transmission member. Secondly, a redundant portion may occur in the wire-like transmission member by reason that the wire-like transmission members intersect with each other in the intersection region portion. This redundant portion is used at the time of bending the intersection region portion, thus strong force is hardly applied to the wire-like transmission member.

(2) It is also applicable that the intersection region portion includes a branch intersection region portion in which some of the plurality of wire-like transmission members are branched from another some of the plurality of wire-like transmission members, and the branch intersection region portion includes a bending position. Accordingly, the wiring member is bended at the branch intersection region portion.

(3) It is also applicable that the intersection region portion includes a replacement intersection region portion replacing an arrangement that some of the plurality of wire-like transmission members are located along another some of the plurality of wire-like transmission members in a parallel direction in a portion where the plurality of wire-like transmission members extend in an identical section, and the replacement intersection region portion includes a bending position. Accordingly, the wiring member is bended at the replacement intersection region portion.

(4) It is also applicable that in the plurality of wire-like transmission members, a wire-like transmission member located on a side of the sheet in the intersection region portion is a lower side wire-like transmission member, a wire-like transmission member overlapped with the lower side wire-like transmission member upper side wire-like transmission member, and at least the upper side wire-like transmission member includes a bending position. Accordingly, the upper side wire-like transmission member which tends to have a high degree of freedom is bended.

(5) A portion of the upper side wire-like transmission member which is not fixed to the lower side wire-like transmission member and the sheet may include a bending position. The portion of the upper side wire-like transmission member which can be moved freely is bended, thus suppressed is strong force on the upper side wire-like transmission member.

(6) It is also applicable that in the plurality of wire-like transmission members, a wire-like transmission member located on a side of the sheet in the intersection region portion is a lower side wire-like transmission member, a wire-like transmission member overlapped with the lower side wire-like transmission member is an upper side wire-like transmission member, and the bending position is a bending position where the upper side wire-like transmission member and the lower side wire-like transmission member are bended so that the upper side wire-like transmission member is located on an inner side. The lower side wire-like transmission member is located on an outer side at the time of bending, thus a curvature radius of the lower side wire-like transmission member is hardly reduced, and suppressed is strong force on the lower side wire-like transmission member.

(7) It is also applicable that in the plurality of wire-like transmission members, a wire-like transmission member located on a side of the sheet in the intersection region portion is a lower side wire-like transmission member, a wire-like transmission member overlapped with the lower side wire-like transmission member is an upper side wire-like transmission member, and at least a part of the lower side wire-like transmission member located along a longitudinal direction is not fixed to the sheet in the intersection region portion. The lower side wire-like transmission member can be moved freely in the intersection region portion, thus suppressed is strong force on the lower side wire-like transmission member.

(8) A wiring member according to the present disclosure is a wiring member including: a plurality of wire-like transmission members; and a sheet to which the plurality of wire-like transmission members are fixed, wherein an intersection region portion where the plurality of wire-like transmission members are disposed on the sheet to intersect with each other is provided, and the intersection region portion is folded. The intersection region portion in the wiring member is folded. At this time, for example, any or a plurality of actions described hereinafter occur, thus suppressed is strong force on the wire-like transmission member. That is to say, the wire-like transmission members are beaded in the thickness direction so as to intersect with each other in the intersection region portion. This bending portion is folded at a time of folding the intersection region portion, thus a region to which force is applied increases in a circumferential direction of the wire-like transmission member. Accordingly, force is diffused, and suppressed is strong force on the wire-like transmission member. A redundant portion may occur in the wire-like transmission member by reason that the wire-like transmission members intersect with each other in the intersection region portion. This redundant portion is used at the time of folding the intersection region portion, thus strong force is hardly applied to the wire-like transmission member.

Details of Embodiment of Present Disclosure

Specific examples of a wiring member of the present disclosure are described hereinafter with reference to the drawings. The present disclosure is not limited to these examples, but is indicated by claims, and it is intended that meanings equivalent s and all modifications within a scope of claims are included.

Embodiment

Figure 2:
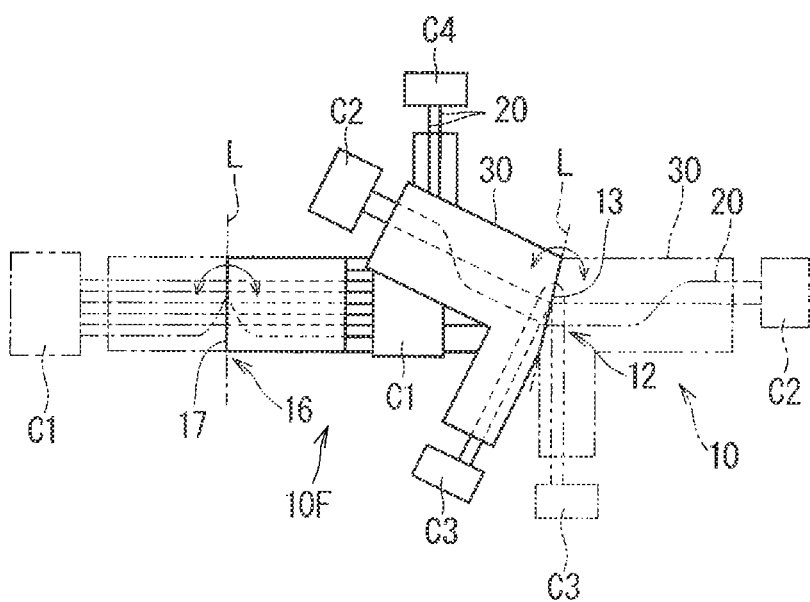
FIG. 2 is a schematic plan view illustrating a bended wiring member.

A wiring member according to an embodiment is described hereinafter. FIG. 1 is a diagram illustrating a wiring member 10 according to the embodiment. FIG. 2 is a schematic plan view illustrating the bended wiring member 10. When the wiring member 10 in a folded state as illustrated in FIG. 2 needs to be distinguished from the wiring member 10 in a developed state as illustrated in FIG. 1, a sign F is assigned to the wiring member 10 to be referred to as the wiring member 10F in some cases.

The wiring member 10 includes a plurality of wire-like transmission members 20 and a sheet 30, The wire-like transmission members 20 are fixed to the sheet 30. The wiring member 10 is mounted to a vehicle, for example. The wiring member 10 is disposed in an arrangement target in a vehicle. The arrangement target is, for example, a body frame, a body panel, and an interior panel in a vehicle. The arrangement target includes an arrangement surface. For example, the wiring member 10 is disposed in the arrangement target while the sheet 30 extends on the arrangement surface. A portion of the wire-like transmission member 20 fixed to the sheet 30 is kept in an extended state along an arrangement route. Accordingly, the wiring member 10 is simply disposed in the arrangement target.

The plurality of wire-like transmission members 20 are wire-like members transmitting an electrical power or light, for example. The sheet 30 is formed into a flat shape as a whole. The plurality of wire-like transmission members 20 are fixed to the sheet 30, thus the wiring member 10 is kept in a flat state. The plurality of wire-like transmission members 20 having the same diameter and structure may be disposed in one sheet 30. Diameters and structures, for example, of the plurality of wire-like transmission members 20 may be appropriately set, and the wire-like transmission members 20 having different diameters and structures may be disposed in the same sheet 30.

The plurality of wire-like transmission members 20 are assumed to be members connecting components in a vehicle. A connector C, for example, is provided on an end portion of the wire-like transmission member 20. This connector C is connected to a connector provided in the other side component, thus the wire-like transmission member 20 is connected to the other side component. That is to say, the present wiring member 10 is used as the wiring member 10 electrically connecting various types of component in a vehicle, for example (or connecting them so that they can perform optical communication). The connector C may be fixed to the sheet 30. The end portion of the wire-like transmission member 20 may extend from the sheet 30 to be connected to the connector C.

Routes of the plurality of wire-like transmission members 20 are set in accordance with a position of a component to which the wire-like transmission members 20 are connected. The plurality of wire-like transmission members 20 are fixed to the sheet 30, thus the plurality of wire-like transmission members 20 are kept in a form following a wiring route corresponding to a position of a component as a connection destination of each wire-like transmission member 20. The plurality of wire-like transmission members 20 may be fixed to the sheet 30 in a state where a branch wire is branched from a main wire. The sheet 30 may also be formed into a shape in which a portion to which the branch wire is fixed is branched from a portion to which the main wire is fixed. Herein, the plurality of wire-like transmission members 20 are branched on the sheet 30.

The plurality of wire-like transmission members 20 are distinguished from the wire-like transmission members 20A, 203, 20C, 20D, 20E, and 20E for convenience. When the wire-like transmission member 20 needs to be distinguished, it is distinguished by the similar sign hereinafter. The plurality of wire-like transmission members 20A, 209, 20C, 20D, 20E, and 20F are fixed to the sheet 30 in a parallel state in one end side of the sheet 30. The plurality of wire-like transmission members 20A, 20B, 20C, 20D, 20E, and 20F are connected to a connector C1 in one end portion of the sheet 30.

The wire-like transmission members 20A and 20B extend along a predetermined route (a straight route herein) on the sheet 30. The other end portions of the wire-like transmission members 20A and 20B are connected to a connector C2.

The wire-like transmission members 20C and 20D extend from the connector C1 to be arranged in parallel to the wire-like transmission members 20A and 20B, and are branched from the wire-like transmission members 20A and 20B on the sheet 30. The other end portions of the wire-like transmission members 20C and 20D are connected to a connector C3.

The wire-like transmission members 20E and 20F extend from the connector C1 to be arranged in parallel to the wire-like transmission members 20A, 20B, 20C, and 20D, and are branched from the wire-like transmission members 20A, 20B, 20C, and 20D on the sheet 30. The other end portions of the wire-like transmission members 20E and 20F are connected to a connector C4.

The connector C1 has a configuration that terminals are housed in a housing in a predetermined order of an arrangement. An arrangement in one end portions of the plurality of wire-like transmission members 20A, 20B, 20C, 20D, 20E, and 20F is determined in accordance with an arrangement of the terminals connected to the plurality of wire-like transmission members 20A, 20B, 20C, 20D, 20E, and 20F housed in the housing of the connector C1.

In the similar manner, each of the connectors C2, C3, and C4 has a configuration that terminals are housed in a housing in a predetermined order of an arrangement. An arrangement in the other end portions of the plurality of wire-dike transmission members 20A, 20B, 20C, 20D, 20E, and 20F is determined in accordance with an arrangement of the terminals connected to the plurality of wire-like transmission members 20A, 20B, 20C, 20D, 20E, and 20F housed in the housings of the connectors C2, C3, and C4.

The wire-like transmission member 20 includes a transmission wire body and a covering layer. The transmission wire body transmits an electrical power or light, for example. The covering layer covers the transmission wire body. For example, the wire-like transmission member 20 may be a general wire having a core wire and a covering layer around the core wire, or may also be a shielded wire, a twisted wire, an enamel wire, a nichrome wire, or an optical fiber. The wire-like transmission member 20 may be an electrical wire such as a bare wire which does not include the covering layer.

The wire-like transmission member 20 transmitting the electrical power may be various kinds of signal lines or various kinds of power lines. Some of the wire-like transmission members 20 transmitting the electrical power may be used as an antenna or coil, for example, transmitting or receiving a signal or electrical power to or from a space.

The wire-like transmission member 20 may be a single wire-like object or a composite object of a plurality of wire-like objects (a twisted wire and a cable made up of a plurality of wire-like objects covered by a sheath).

The wire-like transmission member 20 is fixed to one main surface of the sheet 30. A fixing structure of the wire-like transmission member 20 fixed to the sheet 30 is not particularly limited as long as the wire-like transmission member 20 is fixed to the sheet 30. Applicable as the fixing state are a contact area fixation and a non-contact area fixation, or both fixations may be used together. Herein, the contact area fixation indicates that a portion where the wire-like transmission member 20 and the sheet 30 have contact with each other is stuck and fixed. The non-contact area fixation is a fixing state which is not the contact area fixation, and indicates that a sewing thread, a cover, or an adhesive tape presses the wire-like transmission member 20 toward the sheet 30 or sandwiches the wire-like transmission member 20 and the sheet 30 to keep them in a fixing state. In the description hereinafter, the wire-like transmission member 20 and the sheet 30 are in the state of the contact area fixation.

Applicable as the configuration f the contact area fixation are a contact area indirect fixation and a contact area direct fixation, or both fixations may also be used together in different regions. Herein, the contact area indirect fixation indicates that the wire-like transmission member 20 and the sheet 30 are indirectly stuck and fixed via an adhesive agent, a gluing agent, and a double-sided adhesive tape provided therebetween. The contact area direct fixation indicates that the wire-like transmission member 20 and the sheet 30 are directly stuck and fixed without an intervention of the adhesive agent, for example, which is separately provided. Considered in the contact area direct fixation is that resin included in at least one of the wire-like transmission member 20 and the sheet 30 is melted, thus the wire-like transmission member 20 and the sheet 30 are stuck and fixed, for example.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but a known means such as welding, fusion, and melting joint can be used. For example, when the state of the contact area direct fixation by the heat is formed by welding, various welding means such as ultrasonic welding, heating-pressurizing welding, hot air welding, and high frequency welding can be adopted. When the state of the contact area direct fixation is thrilled by these means, the wire-like transmission member 20 and the sheet 30 are in the state of the contact area direct fixation by these means. Specifically, when the state of the contact area direct fixation is formed by the ultrasonic welding, for example, the wire-like transmission member 20 and the sheet 30 are in the state of the contact area direct fixation by the ultrasonic welding.

In the description hereinafter, the wire-like transmission member 20 and the sheet 30 are in the state of the contact area direct fixation.

The sheet 30 may have a single layer structure. When the sheet 30 has the single layer structure, the one layer is a fixing layer to which the wire-like transmission member 20 is fixed. The sheet 30 may be a resin sheet. For example, the sheet 30 may be formed of resin such as polyvinyl chloride (PVC), polyethylene (PE), polypropylene (PP), or polyethylene terephthalate (PET). The sheet 30 may be a sheet having an evenly filled cross-sectional surface (also referred to as a non-foam sheet or a solid sheet, for example). The sheet 30 is also considered a fibrous material such as a braided cloth, a woven cloth, or a non-woven cloth, for example. The sheet 30 is also considered a foam sheet, for example. The sheet 30 may be a metal sheet.

The sheet 30 may also have a multilayer structure. When the sheet 30 has the multilayer structure, various types of sheet described in the single layer structure described above is adopted to the sheet constituting the fixing layer. Various types of sheet described in the single layer structure described above and a sheet which is not suited for fixation of the wire-like transmission member 20 may be adopted to the sheet which does not constitute the fixing layer. The sheet 30 includes a first layer and a second layer stacked on each other, for example.

The first layer is a fixing layer. Any layer is not particularly limited but can be used as the first layer as long as it can fix the wire-like transmission member 20 to the sheet 30. For example, the first layer may also be a resin layer evenly filled with resin and having an evenly filled cross-sectional surface. The wire-like transmission member 20 is fixed by the first layer. Resin as a material of the first layer is the same as that of the covering layer, for example. One surface of the first layer is one main surface of the sheet 30.

The second layer is a layer for adding or reinforcing a function such as protection. For example, the second layer is a fibrous material layer. One surface of the second layer is the other main surface of the sheet 30. The first layer and the second layer are fixed by adhesion or fusion, for example.

The sheet 30 may be a flexible member. For example, the first layer is a resin layer having an evenly filled cross-sectional surface made up of flexible resin such as soft PVC as a material, the second layer is a non-woven cloth made up of PET as a material, and the sheet 30 is a flexible member. For example, the sheet 30 may have a plastic property so as to be able to follow bending of the wire-like transmission member 20. That is to say, it is also applicable that the wiring member 10 can be bended in a thickness direction (bending so that a fold line follows the main surface of the sheet 30). The sheet 30 may have rigidity to an extent of being able to maintain a planar surface in a state where the wiring member 10 is raised.

Each of the plurality of wire-like transmission members 20 is fixed to the sheet 30 at a plurality of positions at intervals along the longitudinal direction. Each of the plurality of wire-like transmission members 20 may be wholly fixed to the sheet 30 continuously along the longitudinal direction.

The wiring member 10 is provided with intersection region portions 12 and 16. The intersection region portions 12 and 16 are parts of the wiling member 10. The intersection region portions 12 and 16 are regions in which the wire-like transmission members 20 are disposed to intersect with each other on the sheet 30. The Wire-like transmission member 20 on a side of the sheet 30 in two wire-like transmission members 20 intersecting with each other in the intersection region portions 12 and 16 is referred to as a lower side wire-like transmission member. The wire-like transmission member 20 overlapped with the lower side wire-like transmission member is referred to as an upper side wire-like transmission member. A portion where the upper side wire-like transmission member and the lower side wire-like transmission member intersect with each other is referred to as an intersection position CP. The intersection region portions 12 and 16 include the intersection position CP.

The intersection region portion is defined as follows. That is to say, fixation of the upper side wire-like transmission member to the sheet 30 is disconnected in a section passing across at least the lower side wire-like transmission member, Two fixing positions closest to a section where the upper side wire-like transmission member passes across the lower side wire-like transmission member in fixing positions where the upper side wire-like transmission member and the sheet 30 are fixed to each other are referred to as first and second fixing positions. The first fixing position is located on one side of the section where the upper side wire-like transmission member passes across the lower side wire-like transmission member. The second fixing position is located on the other side of the section where the upper side wire-like transmission member passes across the lower side wire-like transmission member. A circle having a diameter, which is made up of a segment connecting the first and second fixing positions, is referred to as a specified circle. When the specified circle includes the intersection position CP, the intersection region portion indicates a region included in the specified circle in the wiring member 10. When the specified circle does not include the intersection position CP, the intersection region portion indicates a region included in a circumscribed circle circumscribed around a polygonal shape made up by connecting intersection positions CP which are not included in the first and second fixing positions and the specified circle in the wiring member 10.

Each of the intersection region portions 12 and 16 includes a bending position FT. The intersection region portions 12 and 16 in the wiring member 10 are bended at a portion of a bending reference line L as illustrated in FIG. 2, for example. The bending reference line L is a virtual line made by extending a fold line CR described hereinafter. The wiring member 10F in which the intersection region portions 12 and 16 are bended enters a folded state as illustrated in FIG. 2 in some cases. For example, a packing form at a time of transporting the wiring member 10 is the wiring member 10F in a folded state. The bending position FT is a trace left in a portion bended in the wiring member 10 when the wiring member 10F in the folded state is developed to be the wiring member 10 at a time of being assembled to a vehicle, for example. The bending position FT indicates a position where the wiring member is bended, and can be considered as a bending trace, for example. Examples of the bending trace include a case where a crease remains in the wire-like transmission member 20. The bending position FT is not limited to the bending trace but can also be considered a position beaded as a package, for example.

The bending trace can be formed in at least one of the sheet 30 and the wire-like transmission member 20 in the state where the wiring member 10 is developed.

Considered as a case where the bending trace is formed in the sheet 30 are a case where the sheet 30 is hard to an extent that the bending trace can be formed and a case where a bending portion is pressed, for example. Considered as a case where the bending trace is not formed in the sheet 30 are a case where the sheet 30 is soft and a case where bending is gradual (for example, a case where bending is performed so that the wire-like transmission member 20 is located on an inner side and the sheet 30 is located on an outer side), for example.

A case where the bending trace is formed in the wire-like transmission member 20 includes a case where the bending trace is formed in the transmission wire body or a covering layer. Considered as a case where the bending trace is formed in the covering layer are a case where the covering layer is hard to an extent that the bending trace can be formed and a case where a bending portion is pressed, for example. Considered as a case where the bending trace is not formed in the covering layer are a case where the covering layer is soft and a case where bending is gradual (for example, a ease where bending is performed so that the sheet 30 is located on an inner side and the wire-like transmission member 20 is located on an outer side), for example.

The intersection region portion 12 is provided in the region A1 in FIG. 1 herein. The intersection region portion 16 is provided in the region A2 in FIG. 1. Each of the intersection region portions 12 and 16 includes the bending position FT. The regions A1 and A2 are described in detail hereinafter.

Region A1

Figure 3:
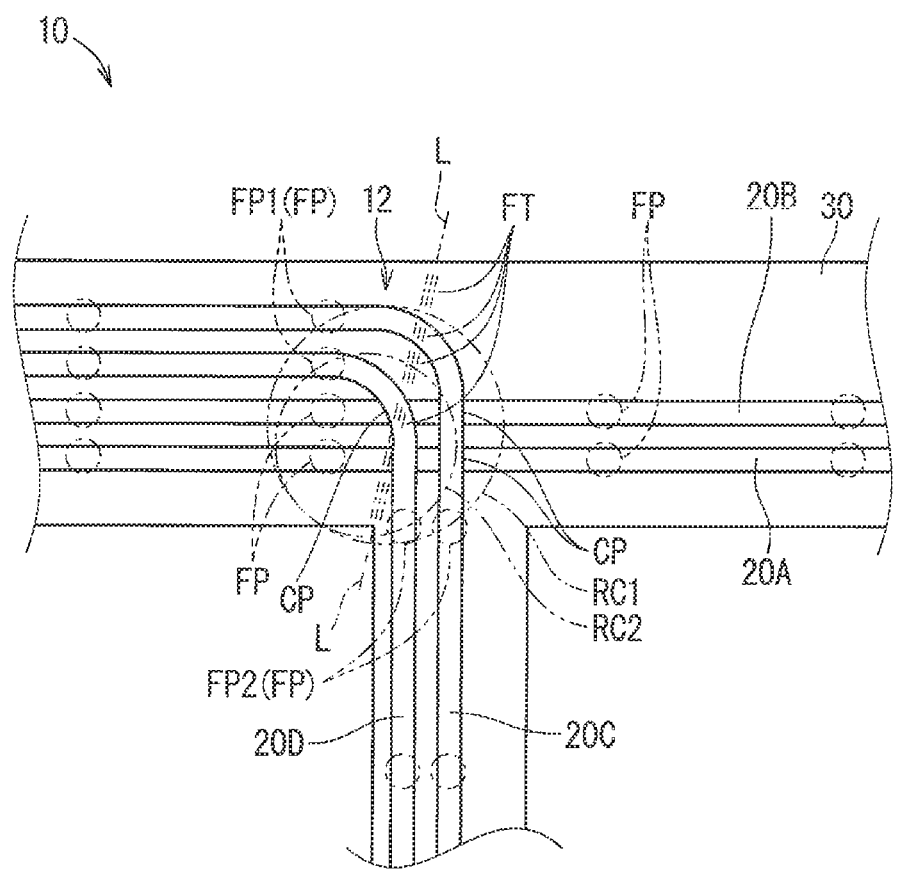
FIG. 3 is an enlarged view of a region A1 in FIG. 1.
Figure 4:
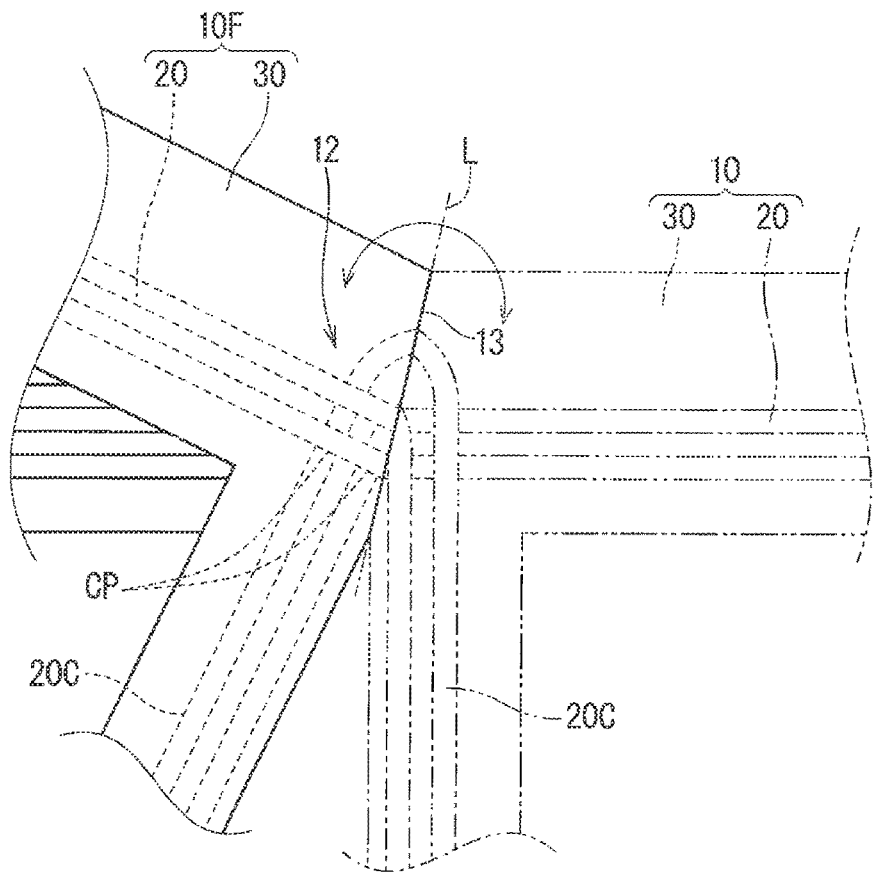
FIG. 4 is an explanation diagram illustrating a portion beaded in the region A1 in the wiring member.

FIG. 3 is an enlarged view of the region A1 in FIG. 1. FIG. 4 is an explanation diagram illustrating a portion bended in the region A1 in the wiring member 10.

The intersection region portion 12 is the branch intersection region portion 12. The branch intersection region portion 12 is a portion where some of the plurality of wire-like transmission members 20 are branched from the other some of the plurality of wire-like transmission members 20. In the example illustrated in FIG. 3, a portion where a branch wire is branched from a main wire in the plurality of wire-like transmission members 20 is the branch intersection region portion 12. Herein, the main wire extends straight, however, the main wire may be bended. Herein, the branch wire extends in a direction perpendicular to the main wire, however, the branch wire may extend in a direction other than the perpendicular direction. Herein, only one branch wire is branched from one branch portion, however, the plurality of branch wires may be branched from one branch portion.

Specifically, the two wire-like transmission members 20A and 20B constitute the whole main wire from one end portion to the other end portion. The two wire-like transmission members 20C and 20D constitute the main wire in a section front one end portion to the branch portion, and constitute the branch wire in a section from the branch portion to the other end portion. The two wire-like transmission members 20C and 20D and the two wire-like transmission members 20A and 20B intersect with each other in a portion where the two wire-like transmission members 20C and 20D are branched from the two wire-like transmission members 20A and 20B.

The sheet 30 is also formed into a branched shape in accordance with the route of the wire-like transmission member 20 in the branch intersection region portion 12. However, the sheet 30 may not be formed into a branched shape in accordance with the route of the wire-like transmission member 20 in the branch intersection region portion 12. For example, the sheet 30 may be formed straight and have a large width so as to be able to fix the main wire and the branch wire. For example, it is also applicable that the sheet 30 is formed straight, can fix the main ware and the branch portion, but does not fix the branch wire.

The two wire-like transmission members 20A and 20B are the lower side wire-like transmission members and the two wire-like transmission members 20C and 20D are the upper side wire-like transmission members in the branch intersection region portion 12, in the example illustrated in FIG. 3, a specified circle RC1 is a specified circle corresponding to the wire-like transmission member 20C. A specified circle RC2 is a specified circle corresponding to the wire-like transmission member 20D. In a portion where the plurality or upper side wire-like transmission members are located such as the intersection region portion 12, a region of the intersection region portion is a portion included in a sum of the specified circles RC1 and RC2 corresponding to each upper side wire-like transmission member in the wiring member 10.

The branch intersection region portion 12 includes the bending position FT. A bending trace is formed in each of the two wire-like transmission members 20C and 201 as the upper side wire-like transmission members, A bending trace is also formed in each of the two wire-like transmission members 20A and 20B as the lower side wire-like transmission members. A bending trace is formed in a lateral side of each of the four wire-like transmission members 20A, 20B, 20C, and 20D in the sheet 30.

Region A2

Figure 5:
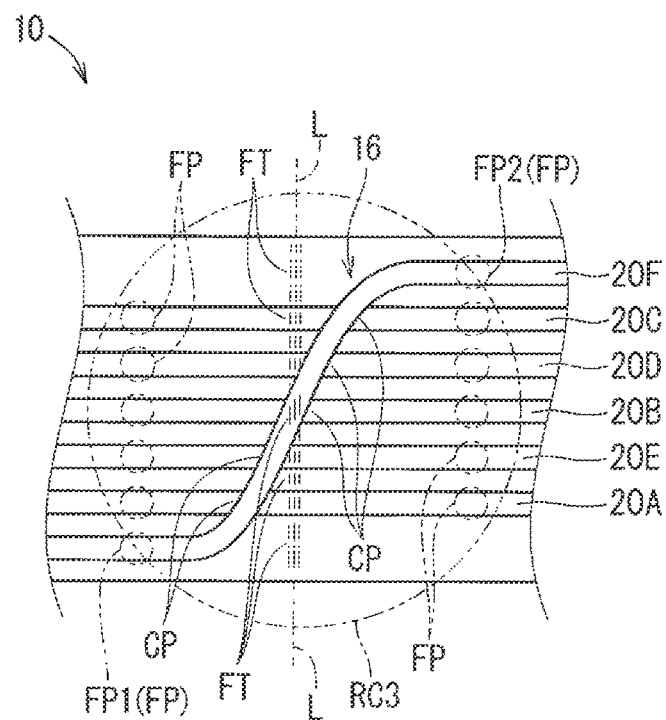
FIG. 5 is an enlarged view of a region A2 in FIG. 1.
Figure 6:
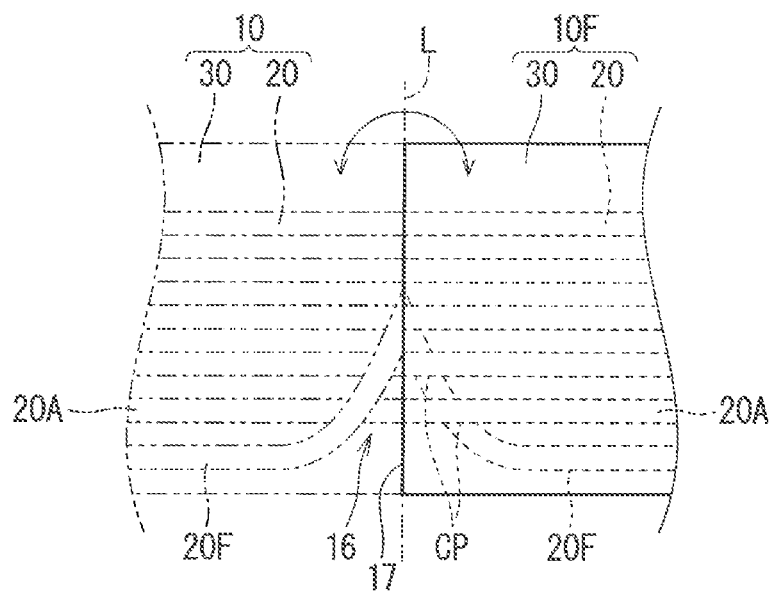
FIG. 6 is an explanation diagram illustrating a portion beaded in the region A2 in the wiring member.
Figure 7:
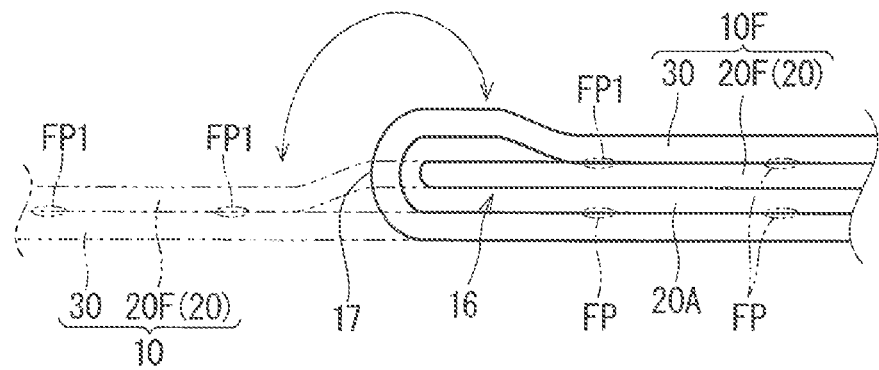
FIG. 7 is a side view illustrating a portion in the region A2 in the wiring member in a beaded state.

FIG. 5 is an enlarged view of the region A2 in FIG. 1, FIG. 6 is an explanation diagram illustrating a portion bended in the region A2 in the wiring member 10. FIG. 7 is a side view illustrating a portion in the region A2 in the wiring member 10 in a bended state.

The intersection region portion 16 is the replacement intersection region portion 16. The replacement intersection region portion 16 is a portion in which an arrangement of some of the plurality of wire-like transmission members 20 is replaced with the other some of the plurality of wire-like transmission members 20 along a parallel direction in a portion where the plurality of wire-like transmission members 20 extend in the same section. The replacement intersection region portion 16 may occur when an arrangement order of connecting one end portions of the plurality of wire-like transmission members 20 to the connector C and an arrangement order of connecting the other end portions thereof to the connector C are different from each other in the example illustrated in FIG. 5, the replacement intersection region portion 16 is provided in a straight route portion. The straight route portion is a portion where the plurality of wire-like transmission members 20 in the straight route portion extend straight.

Herein, the replacement intersection region portion 16 is provided in a portion where six wire-like transmission members 20A, 20B, 20C, 20D, 20E, and 20F are parallelly disposed. The five wire-like transmission members 20A, 20B, 20C, 20D, and 20E are the lower side wire-like transmission members in the replacement intersection region portion 16. One wire-like transmission member 20F is the upper side wire-like transmission member in the replacement intersection region portion 16. A specified circle RC3 is a specified circle corresponding to the wire-like transmission member 20F. The replacement intersection region portion 16 is a portion included in the specified circle RC3 in the wiring member 10.

The replacement intersection region portion 16 includes the bending position FT. A bending trace is formed in the wire-like transmission member 20F as the upper side wire-like transmission member. A bending trace is also formed in each of the wire-like transmission members 20A, 20B, 20C, 20D, and 20E as the lower side wire-like transmission members. A bending trace is formed in a lateral side of each of the six wire-like transmission members 20A, 20B, 20C, 20D, 20E, and 20F in the sheet 30.

Only the wire-like transmission member 20F as the upper side wire-like transmission member is bended and disposed in the replacement intersection region portion 16. The wire-like transmission members 20A, 20B, 20C, 20D, and 20E as the lower side wire-like transmission members may be bended and disposed in the replacement intersection region portion 16.

The wire-like transmission member 20F is not fixed to the sheet 30 in a portion passing across the five wire-like transmission members 20A, 20B, 20C, 20D, and 20E. The wire-like transmission member 20F may be fixed to the sheet 30 between any two adjacent wire-like transmission members 20 in a portion passing across the five wire-like transmission members 20A, 20B, 20C. 20D, and 20E.

In FIG. 3, FIG. 5, and FIG. 7, fixing positions FP where the wire-like transmission members 20 and the sheet 30 are fixed are indicated by dashed-two dotted lines. The wire-like transmission members 20 are fixed to the sheet 30 at the plurality of fixing positions PP at intervals along the longitudinal direction also in the intersection region portions 12 and 16. The bending position FT is located between the plurality of fixing positions FP, Accordingly, as illustrated in FIG. 7, the wiring member 10 is folded in a portion where the wire-like transmission member 20 and the sheet 30 are not fixed to each other. The wiring member 10 may also be folded in a portion where the wire-like transmission member 20 and the sheet 30 are fixed to each other.

As illustrated in FIG. 3 and FIG. 5, a bending trace is formed in each of the upper side wire-like transmission member and the lower side wire-like transmission member in each of the intersection region portions 12 and 16. The bending trace may not be formed in any of the upper side wire-like transmission member and the lower side wire-like transmission member in each of the intersection region portions 12 and 16. It is preferable that at least the upper side wire-like transmission member includes the bending position FT in each of the intersection region portions 12 and 16. It is preferable that a portion of the upper side wire-like transmission member which is not fixed to the lower side wire-like transmission member and the sheet 30 includes the bending position FT. A portion of the upper side wire-like transmission member fixed to the lower side wire-like transmission member or the sheet 30 may include the bending position FT.

As illustrated in FIG. 3 and FIG. 5, it is preferable that the bending position FT is located in a center portion between a first fixing position FP1 and a second fixing position FP2 or a position close to the center portion in the upper side wire-like transmission member in each of the intersection region portions 12 and 16. When the upper side wire-like transmission member is fixed to the lower side wire-like transmission member in the intersection position CP, it is preferable that the bending position FT is located in the center portion between the first fixing position FP1 and the second fixing position FP2 or the position close to the center portion in the upper side wire-like transmission member. The reason is that the center portion in the upper side wire-like transmission member has a highest degree of freedom in the intersection region portions 12 and 16.

As illustrated, in FIG. 3 and FIG. 5, the upper side wire-like transmission member is bended and disposed in each of the intersection region portions 12 and 16. A bending portion in the upper side wire-like transmission member includes the bending position FT. A straight portion in the upper side wire-like transmission member may include the bending position FT. The lower side wire-like transmission member may also be bended and disposed. Bending on the bending portion in the upper side wire-like transmission member may be inflection or curvature. When the bending on the bending portion in the upper side wire-like transmission member is inflection, a bending portion in the upper side wire-like transmission member corresponding to an inflection point of the wire-like transmission member 20 preferably includes the bending position FT. When the bending on the bending portion in the upper side wire-like transmission member is curvature, a bending portion in the upper side wire-like transmission member corresponding to any position in a curvature section in the wire-like transmission member 20 preferably includes the bending position FT.

As illustrated in FIG. 5, the upper side wire-like transmission member and the lower side wire-like transmission member obliquely intersect with each other in the intersection region portion 16. As illustrated in FIG. 3, the wire-like transmission member 20D as the upper side wire-like transmission member also obliquely intersects with the lower side wire-like transmission member in the intersection region portion 12. As illustrated in FIG. 3 and FIG. 5, the upper side wire-like transmission member and the lower side wire-like transmission member include the bending positions FT in the intersection position CP where they obliquely intersect with each other in each of the intersection region portions 12 and 16. As illustrated in FIG. 3, the wire-like transmission member 20C as the upper side wire-like transmission member and the lower side wire-like transmission member perpendicularly intersect with each other in the intersection region portion 12. The intersection position CP in which the upper side wire-like transmission member and the lower side wire-like transmission member perpendicularly intersect with each other may include the bending position FT.

In the bending position FT, bending may be performed so that the upper side wire-like transmission member is located on an inner side in the upper side wire-like transmission member and the lower side wire-like transmission member. The bending position FT in which the upper side wire-like transmission member is bended to be located on an inner side is the bending position FT in which an extension trace is formed in a lower surface directed to a side of the sheet 30 or a compression trace is formed in an upper surface directed to a side opposite to the lower surface in the wire-like transmission member 20, for example. The bending position FT bended so that the upper side wire-like transmission member is located on an inner side is the bending position FT in which a compression trace is formed in one main surface of the sheet 30 where the wire-like transmission member 20 is disposed or an extension trace is formed in the other main surface directed to a side opposite to one main surface, for example.

As illustrated in FIG. 3 and FIG. 5, at least a part of the lower side wire-like transmission member along the longitudinal direction in each of the intersection region portions 12 and 16 is not fixed to the sheet 30. It is preferable that a portion of the lower side wire-like transmission member which is not fixed to the sheet 30 has the bending position FT. It is preferable that a portion of the lower side wire-like transmission member overlapped with the fold line CR is not fixed to the sheet 30. A portion of the lower side wire-like transmission member fixed to the sheet 30 may include the bending position FT. The lower side wire-like transmission member may be wholly fixed to the sheet 30 along the longitudinal direction in each of the intersection region portions 12 and 16.

The intersection region portions 12 and 16 in the wiring member 10 are beaded at a portion of a bending reference line L as illustrated in FIG. 2, for example. The bending reference line L is a virtual line made by extending the fold line CR. The wiring member 10F in which the intersection region portions 12 and 16 are bended enters a folded state as illustrated in FIG. 7 in some cases. For example, a packing form at a time of transporting the wiring member 10 is the wiring member 10F in a folded state. The bending position FT is a trace left in a portion bended in the wiring member 10 when the wiring member 10F in the folded state is developed to be the wiring member 10 at a time of being assembled to a vehicle, for example.

As illustrated in FIG. 1, the fold line CR can be recognized from the bending trace in the wiring member 10. For example, when a bending trace formed in any one of the members has a linear shape, a line thereof is recognized as the fold line CR. For example, when bending traces are formed in a plurality of members and the bending traces of the plurality of members are arranged in a row, a virtual line connecting the bending traces of the plurality of members is recognized as the fold line CR.

Folding positions 13 and 17 are located in the intersection region portions 12 and 16 in the wiring member 10 in the folded state described above, that is to say, in the wiring member 10F (refer to FIG. 2). When this wiring member 10F is developed, the bending positions FT as the traces of the folding positions 13 and 17 are located in the intersection region portions 12 and 16 (refer to FIG. 1). The bending positions FT are observed as traces left as creases in the wire-like transmission member 20 or traces left as creases in the sheet 30.

Effect Etc.

According to the wiring member 10 having the configuration described above, the intersection region portions 12 and 16 in the wiring member 10 is bended, thus strong force on a wire-like transmission member 20 is suppressed. A plurality of actions are considered as this action, and first and second actions described hereinafter are considered as examples.

Firstly, the wire-like transmission members 20 are bended in a thickness direction so as to intersect with each other in the intersection region portions 12 and 16. This bending portion is bended at the time of bending the intersection region portions 12 and 16, thus a region to which force is applied increases in a circumferential direction of the wire-like transmission member 20. Accordingly, force is diffused, and suppressed is strong force on the wire-like transmission member 20. In this regard, when the bending position FT is located in a portion of the wire-like transmission member 20 bended and disposed on the sheet 30, a region to which force is applied is further increased in a circumferential direction the wire-like transmission member 20. Accordingly, force is diffused, and suppressed is strong force on the wire-like transmission member 20.

Secondly, a redundant portion may occur in the wire-like transmission member 20 by reason that the wire-like transmission members 20 intersect with each other in the intersection region portions 12 and 16. This redundant portion is used at the time of bending the intersection region portions 12 and 16, thus strong force is hardly applied to the wire-like transmission member 20.

The branch intersection region portion 12 includes the bending position FT, thus the wiring member 10 is bended at the branch intersection region portion 12. The replacement intersection region portion 16 includes the bending position FT, thus the wiring member 10 is bended at the replacement intersection region portion 16.

At least the upper side wire-like transmission member includes the bending position FT, thus the upper side wire-like transmission member which tends to have a high degree of freedom is bended. The portion of the upper side wire-like transmission member which is not fixed to the lower side wire-like transmission member and the sheet 30 includes the bending position FT, thus when the portion of the upper side wire-like transmission member which can be moved freely is bended, suppressed is strong force on the upper side wire-like transmission member.

In the bending position FT, bending is performed so that the upper side wire-like transmission member is located on an inner side in the upper side transmission member and the lower side wire-like transmission member. The lower side wire-like transmission member is located on the outer side at the time of bending, thus the curvature radius of the lower side wire-like transmission member is hardly reduced, and suppressed is strong force on the lower side wire-like transmission member.

At least a part of the lower side wire-like transmission member along the longitudinal direction in each of the intersection region portions 12 and 16 is not fixed to the sheet 30. The lower side wire-like transmission member can be moved freely in the intersection region portions 12 and 16, thus suppressed is strong force on the lower side wire-like transmission member.

Additional Statement

A wiring member in which the intersection region portions 12 and 16 are folded such as the wiring member 10F in the folded state may also be considered as the wiring member according to the present disclosure. The wiring member in which the intersection region portions 12 and 16 are folded is a wiring member in which the intersection region portions 12 and 16 are folded in the thickness direction of the sheet 30. That is to say, the wiring member may be the wiring member including the plurality of wire-like transmission members 20; and the sheet 30 to which the plurality of wire-like transmission members 20 are fixed, wherein the intersection region portions 12 and 16 where the plurality of wire-like transmission members 20 are disposed on the sheet 30 to intersect with each other are provided, and the intersection region portions 12 and 16 are folded.

Such a wiring member may have a packing form or a than disposed in a vehicle. Also according to such a wiring member, the intersection region portions 12 and 16 are folded, thus strong force is hardly applied to the wire-like transmission member 20 by the first and second actions described above, for example.

Modification Example

In the description in the embodiment, each of the intersection region portions 12 and 16 includes the bending position FT, and the wiring member 10 includes the two bending positions FT, however, this configuration is not necessary. The wiring member 10 may include only one bending position FT, or may also include three or more bending positions FT.

In the description, only the intersection region portions 12 and 16 include the bending position FT, however, this configuration is not necessary. A portion other than the intersection region portions 12 and 16 may include the bending position FT. For example, a straight route portion may include the bending position FT. The intersection region portions 12 and 16 may include at least one bending position FT.

When the plurality of intersection region portions are provided in the wiring member 10, all of the plurality of intersection region portions may include the bending position FT. Only some intersection region portions in the plurality of intersection region portions may include the bending position FT. That is to say, the intersection region portion with no bending position FT is also applicable.

As illustrated in FIG. 1, the wiring member 10 described in the embodiment is provided with intersection region portions 14 and 18 in addition to the intersection region portions 12 and 16.

In the intersection region portion 14, the wire-like transmission members 20E and 20F intersect with the wire-like transmission members 20A, 20B, 20C, and 20D while being branched from them. Accordingly, the intersection region portion 14 is the branch intersection region portion 14. The branch intersection region portion 14 does not include the bending position FT.

In the intersection region portion 18, the wire-like transmission members 20A and 20B extend in the same direction and intersect with each other in a midway portion, thus an order of an arrangement is changed. Accordingly, the intersection region portion 18 is the replacement intersection region portion 18. The replacement intersection region portion 18 does not include the bending position FT.

In the above description, the replacement intersection region portion 16 is provided in the straight route portion, however, this configuration is not necessary. The replacement intersection region portion 16 may be provided in the same route bending portion. The same route bending portion is a portion in which the plurality of wire-like transmission members 20 extend in the same direction, and bended and disposed. The sheet 30 may also be formed into a bended shape along the route of the wire-like transmission member 20 in the same route bending portion. The sheet 30 may not be formed into a bended shape along the route of the wire-like transmission member 20 in the same route bending portion. For example, the sheet 30 may be formed straight and have a large width so that the wire-like transmission member 20 can be disposed therein in a bended form.

The upper side wire-like transmission member is bended and disposed between the first fixing position FP1 and the second fixing position FP2, however, this configuration is not necessary. The upper side wire-like transmission member may be disposed straight between the first fixing position FP1 and the second fixing position FP2.

Each configuration described in the embodiment and each modification example can be appropriately combined as long as they are not contradictory.

EXPLANATION OF REFERENCE SIGNS 10 wiring member
10F wiring member (folded state)
12, 14 branch intersection region portion (intersection region portion)
13 folding position
16, 18 replacement intersection region portion (intersection region portion)
17 folding position
20, 20A, 208, 20C, 201, 20E, 20F wire-like transmission member
30 sheet
C, C1, C2, C3, C4 connector
FT bending position
FP fixing position
FP1 first fixing position
FP2 second fixing position
CP intersection position
CR fold line

The invention claimed is:
1. A wiring member, comprising:
a plurality of wire-like transmission members; and
a sheet to which the plurality of wire-like transmission members are fixed, wherein
one intersection region portion where the plurality of wire-like transmission members are disposed on the sheet to intersect with each other is provided, and
the one intersection region portion includes a respective bending position, wherein
the respective bending position overlaps a preformed folding line formed in the wiring member,
the one intersection region portion includes a replacement intersection region portion replacing an arrangement that some of the plurality of wire-like transmission members are located along another some of the plurality of wire-like transmission members in a parallel direction in a portion where the plurality of wire-like transmission members extend in an identical section, and
the replacement intersection region portion includes the respective bending position.

2. The wiring member according to claim 1, comprises another intersection region portion that includes a branch intersection region portion in which some of the plurality of wire-like transmission members are branched from another some of the plurality of wire-like transmission members, and
the branch intersection region portion includes a respective bending position.

3. The wiring member according to claim 1, wherein
in the plurality of wire-like transmission members, a wire-like transmission member located on a side of the sheet in the one intersection region portion is a lower side wire-like transmission member, and a wire-like transmission member overlapped with the lower side wire-like transmission member is an upper side wire-like transmission member, and
at least the upper side wire-like transmission member includes the respective bending position.

4. The wiring member according to claim 3, wherein
a portion of the upper side wire-like transmission member which is not fixed to the lower side wire-like transmission member and the sheet includes the respective bending position.

5. The wiring member according to claim 1, wherein
in the plurality of wire-like transmission members, a wire-like transmission member located on a side of the sheet in the one intersection region portion is a lower side wire-like transmission member, and a wire-like transmission member overlapped with the lower side wire-like transmission member is an upper side wire-like transmission member, and
in the respective bending position, the upper side wire-like transmission member and the lower side wire-like transmission member are bended so that the upper side wire-like transmission member is located on an inner side.

6. The wiring member according to claim 1, wherein
in the plurality of wire-like transmission members, a wire-like transmission member located on a side of the sheet in the intersection region portion is a lower side wire-like transmission member, and a wire-like transmission member overlapped with the lower side wire-like transmission member is an upper side wire-like transmission member, and
at least a part of the lower side wire-like transmission member located along a longitudinal direction is not fixed to the sheet in the one intersection region portion.

7. The wiring member according to claim 1, wherein the preformed folding line follows a main surface of the sheet and extends from one end to another end of the sheet in a direction in which the plurality of the wire-like transmission member is arranged.

8. The wiring member according to claim 1, wherein folding of the preformed folding line comprises folding where one portion overlaps with another portion with respect to the preformed folding line in the sheet.

9. A wiring member, comprising:
    a plurality of wire-like transmission members; and
    a sheet to which the plurality of wire-like transmission members are fixed, wherein
    an intersection region portion where the plurality of wire-like transmission members are disposed on the sheet to intersect with each other is provided, and the intersection region portion includes a bending position, wherein
    the bending position overlaps a preformed folding line at which the intersection region portion is folded, wherein
    the preformed folding line is formed in the wiring member, and wherein
    the intersection region portion includes a replacement intersection region portion replacing an arrangement that some of the plurality of wire-like transmission members are located along another some of the plurality of wire-like transmission members in a parallel direction in a portion where the plurality of wire-like transmission members extend in an identical section, and
    the replacement intersection region portion includes the bending position.

10. The wiring member according to claim 9, wherein the preformed folding line follows a main surface of the sheet and extends from one end to another end of the sheet in a direction in which the plurality of the wire-like transmission member is arranged.

11. The wiring member according to claim 9, wherein folding of the preformed folding line comprises folding where one portion overlaps with another portion with respect to the preformed folding line in the sheet.

\* \* \* \* \*